United States Patent
Salomon, Jr.

(10) Patent No.: US 11,435,654 B2
(45) Date of Patent: Sep. 6, 2022

(54) CAMERA TRIPOD WITH SURGE PROTECTED OUTLETS

(71) Applicant: Berysin Salomon, Jr., Kolonia (FM)

(72) Inventor: Berysin Salomon, Jr., Kolonia (FM)

(*) Notice: Subject to any disclaimer, the term of this patent is extended or adjusted under 35 U.S.C. 154(b) by 0 days.

(21) Appl. No.: 17/224,250

(22) Filed: Apr. 7, 2021

(65) Prior Publication Data
US 2021/0311377 A1    Oct. 7, 2021

Related U.S. Application Data

(60) Provisional application No. 63/006,369, filed on Apr. 7, 2020.

(51) Int. Cl.
| | | |
|---|---|---|
| *G03B 17/56* | (2021.01) | |
| *F16M 11/34* | (2006.01) | |
| *H01R 13/66* | (2006.01) | |
| *H01R 25/00* | (2006.01) | |

(52) U.S. Cl.
CPC .......... *G03B 17/561* (2013.01); *F16M 11/34* (2013.01); *H01R 25/006* (2013.01); *G03B 17/566* (2013.01); *H01R 13/6666* (2013.01)

(58) Field of Classification Search
None
See application file for complete search history.

(56) References Cited

U.S. PATENT DOCUMENTS

| | | | |
|---|---|---|---|
| 7,484,858 B2 | 2/2009 | Deighton et al. | |
| 7,614,600 B1 | 11/2009 | Smith et al. | |
| 7,986,367 B2 | 7/2011 | DeSorbo | |
| 9,178,324 B2 | 11/2015 | Beldock et al. | |
| 2009/0095855 A1* | 4/2009 | Su ........................ | F16M 11/242 248/177.1 |
| 2013/0265780 A1 | 10/2013 | Choksi et al. | |

FOREIGN PATENT DOCUMENTS

KR        20140001018 U  *  2/2014  ............. F16M 11/32

OTHER PUBLICATIONS

"New Losmandy LW Tripod Power Rig". https://www.cloudynights.com/topic/612342-new-losmandy-lw-tripod-power-rig/ (Year: 2018).*
Tripp-Lite TLP74RB surge protector product page at https://www.tripplite.com/protect-it-7-outlet-surge-protector-4-ft-cord-1080-joules-1-diagnostic-led-black-housing~TLP74RB (Year: 2022).*

(Continued)

*Primary Examiner* — Leon W Rhodes, Jr.
(74) *Attorney, Agent, or Firm* — Boudwin Intellectual Property; Daniel Boudwin

(57) ABSTRACT

A camera tripod with surge protector outlets is provided. The device includes a central shaft affixed to a base. A plurality of support legs is pivotally affixed to the base, wherein each of the plurality of support legs is telescopically adjustable in length. The base removably secures a camera thereto via a threaded connection. At least one surge protected outlet is affixed to one of the plurality of support legs, wherein the surge protected outlet is electrically connected to an external power source. In some embodiments, the surge protected outlet is electrically connected to one or more batteries removably secured within a battery compartment defined within an interior volume of the central shaft.

20 Claims, 5 Drawing Sheets

(56) References Cited

OTHER PUBLICATIONS

"Powerstrip leg grip", https://www.thingiverse.com/thing:3172119 (Year: 2018).*
Tether tools Aero PowerMount product listing at https://www.tethertools.com/products/aero-powermount, archive.org copy dated Jul. 8, 2017 (Year: 2017).*
"Tether Tools introduces two new products to ONsite Power solutions" https://www.provideocoalition.com/tether-tools-introduces-two-new-products-to-onsite-power-solutions/), (Year: 2019).*
"Cable Management/Power Management Advice" at https://www.cloudynights.com/topic/605855-cable-managementpower-management-advice/?p=8352558 (Year: 2018).*

* cited by examiner

CAMERA TRIPOD WITH SURGE PROTECTED OUTLETS

CROSS REFERENCE TO RELATED APPLICATIONS

This application claims the benefit of U.S. Provisional Application No. 63/006,369 filed on Apr. 7, 2020. The above identified patent application is herein incorporated by reference in its entirety to provide continuity of disclosure.

BACKGROUND OF THE INVENTION

The present invention relates to camera tripods. More particularly, the present invention pertains to a camera tripod with an electrical connection to a power source to power and protect the camera from electrical surges via the connection to an outlet disposed on the tripod.

Many individuals use tripods when filming or taking pictures to provide a steady base for photography. Additional electronic devices, such as lights, may be mounted on tripods to further aid in the process of filming or photographing an event. While many of these devices may include a battery power source, the prolonged nature of many of these events may require that every electronic device be connected to an external power source. Often, photographers utilize several banks of charged batteries to replace the depleted batteries throughout the event, however, carrying a sufficient number of additional batteries is often cumbersome and uncomfortable. Furthermore, these additional batteries are often very expensive. An alternative to a large number of batteries is to utilize a building's existing power outlets, however the number of available outlets and location of these outlets can be a limiting factor. Additionally, using multiple electronic devices during an event can require a large number of cables extending between each electronic device and the existing wall outlet, which can pose a tripping hazard as well as being unsightly. Therefore, a tripod that allows a user to power several electronic devices with minimal electrical cabling between the tripod and an external power source is desired.

In light of the devices disclosed in the known art, it is submitted that the present invention substantially diverges in design elements from the known art and consequently it is clear that there is a need in the art for an improvement to existing camera tripods. In this regard, the instant invention substantially fulfills these needs.

SUMMARY OF THE INVENTION

In view of the foregoing disadvantages inherent in the known types of camera tripods now present in the known art, the present invention provides a camera tripod wherein the same can be utilized for providing convenience for the user when providing continuous power to a variety of electronic devices, including a camera mounted on the tripod.

The present system comprises a central shaft affixed to a base, wherein a plurality of support legs is pivotally affixed to the base. Each of the support legs is telescopically adjustable in length. The base is configured to removably secure a camera thereto via a threaded connection. At least one surge protected outlet is affixed to at least one of the plurality of support legs, wherein the surge protected outlet is electrically connected to an external power source. In some embodiments, the central shaft includes an open distal end defining an interior volume, wherein a cap is removably securable to the open distal end. The interior volume of the central shaft comprises a battery compartment configured to electrically connect one or more batteries to the surge protected outlet. In other embodiments, a support hook is disposed on a lower end of the cap.

In some embodiments, at least one USB port is disposed on one of the plurality of support legs, wherein the USB port is operably connected to the external power source. In another embodiment, a cable is disposed within a compartment defined within one of the plurality of support legs, wherein the cable is configured to operably connect the external power source to the surge protected outlet. In other embodiments, the cable is retractably affixed to a spool within the compartment, wherein the cable is biased to a retracted position about the spool. In yet another embodiment, a door is affixed to the compartment, wherein the door is selectively movable between an open position and a closed position, wherein the closed position, the door encloses the compartment. In some embodiments, the electrical connection between the cable and the surge protected outlet comprises insulated internal wiring disposed between the central shaft and the plurality of support legs. In another embodiment, the at least one surge protected outlet is pivotally affixed to one of the plurality of support legs. In other embodiments, the base is pivotally affixed to the central shaft, such that an angle of the base relative to a ground surface is adjustable. In yet another embodiment, a tension handle is affixed to the base, the tension handle configured to selectively pivot the base when actuated. In some embodiments, the surge protected outlet is disposed on an upper section of one of the plurality of support legs. In another embodiment, a plurality of hinged braces extends between each of the plurality of support legs and a collar, wherein the collar is slidably disposed about the central shaft.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
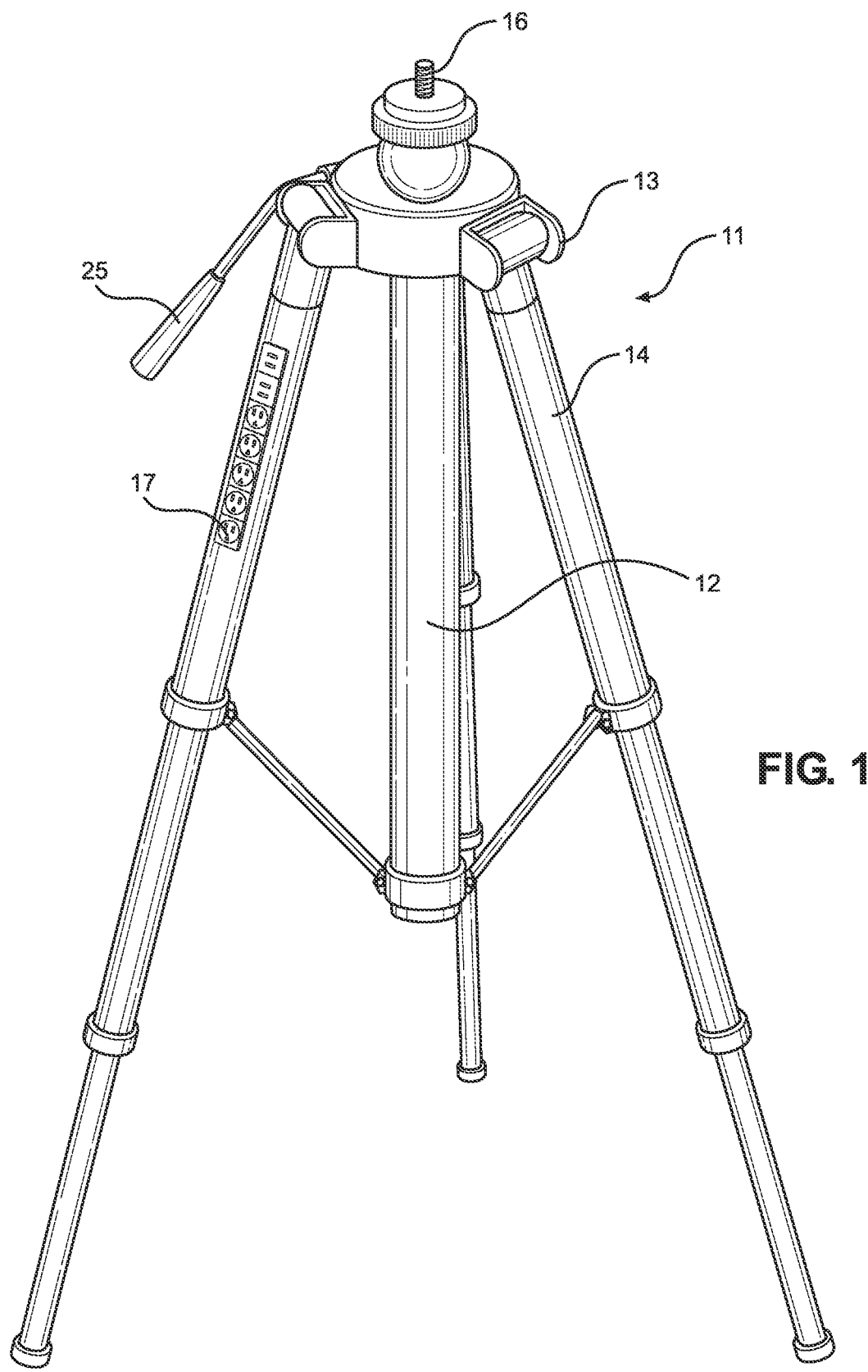
FIG. 1 shows a perspective view of an embodiment of the camera tripod with surge protected outlets.

Reference is made herein to the attached drawings. Like reference numerals are used throughout the drawings to depict like or similar elements of the camera tripod with surge protected outlets. The figures are intended for representative purposes only and should not be considered to be limiting in any respect.

Figure 5:
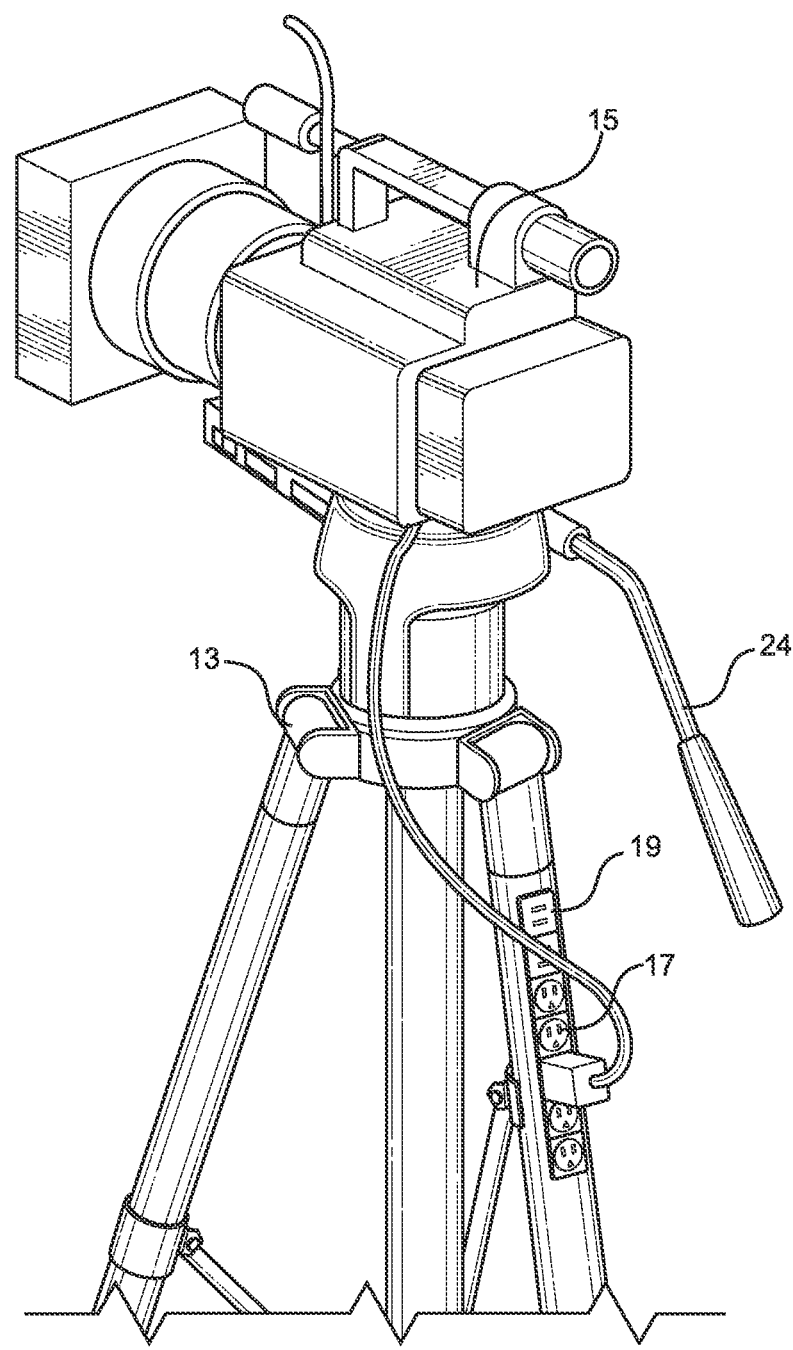
FIG. 5 shows a perspective view of an embodiment of the camera tripod with surge protected outlets in use.

Referring now to FIG. 1, there is shown a perspective view of an embodiment of the camera tripod with surge protected outlets. The tripod with surge protected outlets 11 comprises a central shaft 12 having a base 13 on an upper end thereof, wherein a plurality of legs 14 are pivotally affixed to the base 13. In the illustrated embodiment, each of the plurality of legs 14 is telescopically adjustable in length such that a height of the base 13 relative to a support surface can be adjusted. A threaded connection 16 is affixed to the base 13, wherein the threaded connection 16 is configured to removably secure a camera (as shown in FIG. 5, 15), lighting assembly, or another electronic device thereto. In the shown embodiment, the base 13 is pivotally adjustable, such that a camera disposed on the threaded connection 16 can be pivoted in a desired direction. In the illustrated embodiment, the base 13 is pivotally adjustable via a ball and socket joint to allow a user to tilt the device mounted to the base 13 relative to the ground surface, however, in alternate embodiments, the base 13 comprises a cylindrical adjustment mechanism rotationally affixed to the central shaft 12 for rotational adjustment of the mounted camera. In such embodiments, a tension handle 25 is affixed to the base 13, such that the user can adjust the position of the base 13 via actuating the tension handle 25.

A plurality of outlets 17 are disposed on at least one of the plurality of legs 14, wherein the plurality of outlets 17 can be operably connected to a power source. The plurality of outlets 17 are contemplated to include surge protection mechanisms, such that power transfer from each outlet is interrupted upon detection of a power surge to prevent damage to a connected electronic device. The power source is contemplated to comprise either an external power source, such as a typical building's power supply, or a portable power source, such as a generator or battery power source. In this manner, the plurality of outlets 17 are contemplated to provide power to a variety of electronic devices, such as cameras, lighting assemblies, remote electronic devices such as mobile phones and tablets, or other electronic devices. As multiple electronic devices require separate connections to power sources, simultaneous connection of each electronic device may otherwise be impractical, as building outlets may be limited, or excess unsightly cabling providing a tripping hazard may be undesirable.

Figure 2:
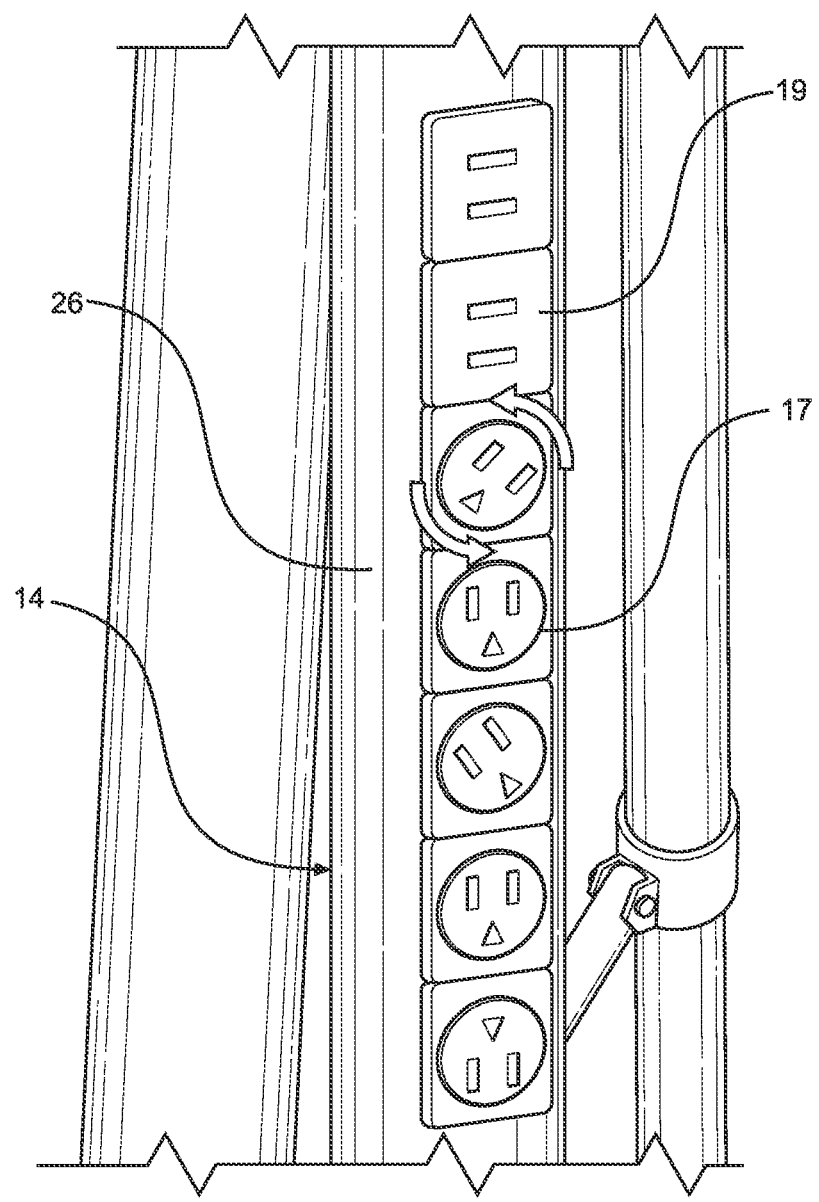
FIG. 2 shows a close-up view of the outlets of an embodiment of the camera tripod with surge protected outlets.

Referring now to FIG. 2, there is shown a close-up view of the outlets of an embodiment of the camera tripod with surge protected outlets. In the illustrated embodiment, the plurality of outlets 17 are disposed linearly along a length of an upper section 26 of at least one of the plurality of legs 14. The plurality of outlets 17 are disposed on the upper section 26 such that the plurality of outlets 17 do not interfere with the telescopic operation of the plurality of legs 14. In the shown embodiment, the plurality of outlets 17 comprise three-pronged American outlets, however alternate outlet structures are contemplated for use in international or non-grounded applications. In the illustrated embodiment, the plurality of outlets 17 are rotationally affixed to at least one leg of the plurality of legs 14, such that the outlets are pivotable about an axis perpendicular to a longitudinal axis of the leg. In this manner, the user can adjust the orientation of the outlet to accommodate electrical connections with devices in various locations about the tripod. In some embodiments, the plurality of outlets 17 are pivotally affixed to at least one of the plurality of legs 14 similar to a rocker switch, wherein the pivotal axis is aligned with a longitudinal axis of the leg. In this manner, the user can laterally position the plurality of outlets 17 at an angle relative to an initial position to accommodate devices on lateral sides of the tripod. In the shown embodiment, a plurality of USB ports 19 are disposed adjacent to the plurality of outlets 17, wherein the plurality of USB ports 19 is similarly connected to a power source. In this manner, users can electrically connect a variety of additional electronic devices to the tripod, such as mobile phones and tablets.

Figure 3:
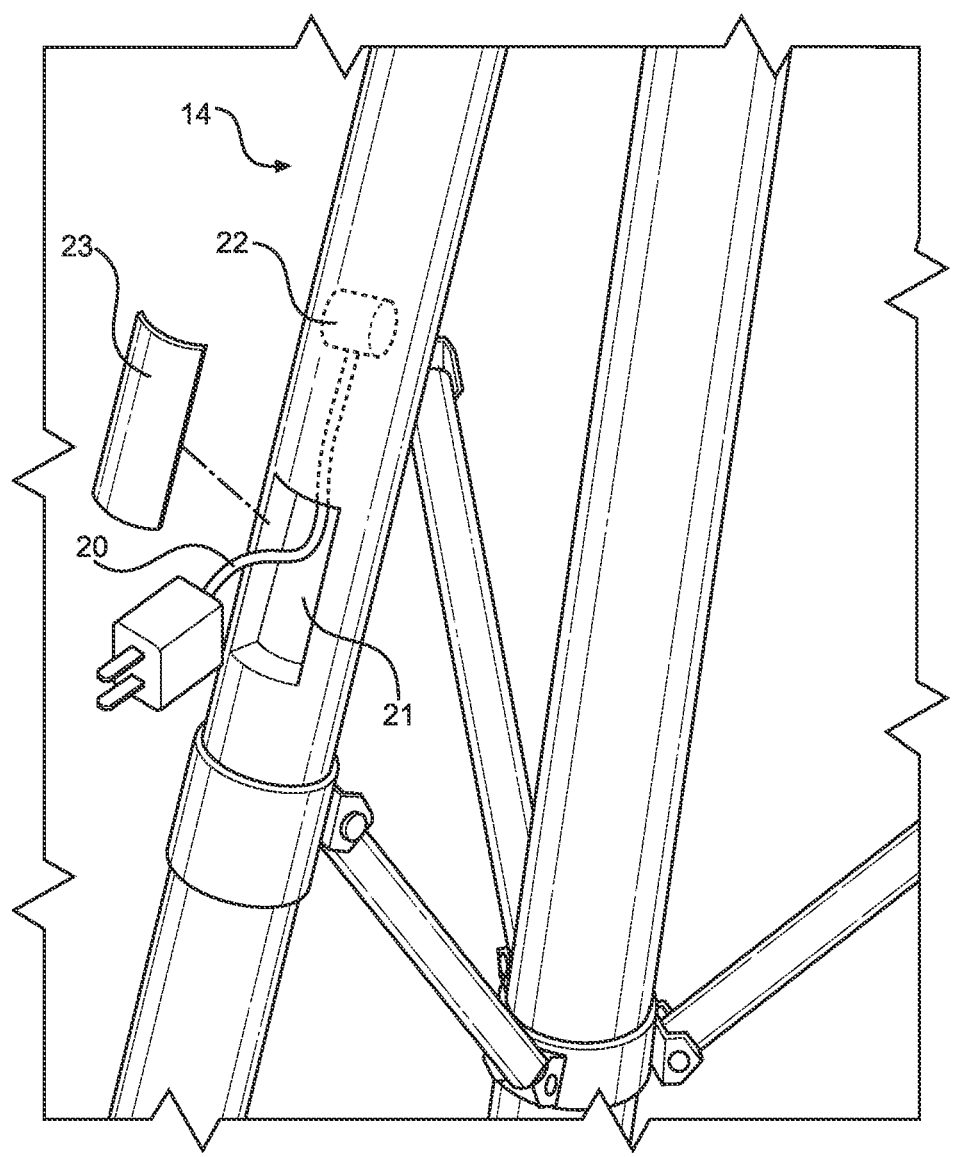
FIG. 3 shows a close-up view of the compartment of an embodiment of the camera tripod with surge protected outlets.

Referring now to FIG. 3, there is shown a close-up view of the compartment of an embodiment of the camera tripod with surge protected outlets. In the illustrated embodiment, a compartment 21 is defined within one leg of the plurality of legs 14, wherein the compartment 21 houses a cable 20 therein. The cable 20 is electrically connected to the plurality of outlets, such that power transferred through the cable 20 is transferred to the plurality of outlets. In some embodiments, the cable 20 is operably connected to the plurality of outlets via insulated wiring extending between each of the plurality of legs 14 through the base. In the shown embodiment, the cable 20 includes a two-pronged plug, however, in alternate embodiments, the plug comprises a variety of electrical connections to accommodate various international standards. In the shown embodiment, the compartment 21 further comprises a door 23 removably securable thereto, wherein the door 23 is contemplated to enclose the compartment 21 when secured to the leg. In some embodiments, the door 23 is hingedly connected to the leg to swivel between an open position and a closed position. In the illustrated embodiment, the cable 20 is further affixed to a spool 22, wherein the cable 20 is movable between an extended position and a retracted position, wherein the retracted position the cable 20 is secured about the spool 22. In such embodiments, the spool 22 is automatically retractable, such that the cable 20 is biased towards the retracted position. in this manner, once the user disconnects and releases the cable 20, the spool 22 rotates such that the cable 20 is coiled about the spool 22. The cable 20 can be utilized to connect the plurality of outlets to an external power source, such as existing outlets in a building or event location, such that the number of exposed cables required to power a variety of electronic devices is decreased. In this manner, the cable 20 effectively consolidates the number of electrical connections required between the building outlets and the electronic devices to a single cable, thereby reducing risk of tripping or unsightly cables.

Figure 4:
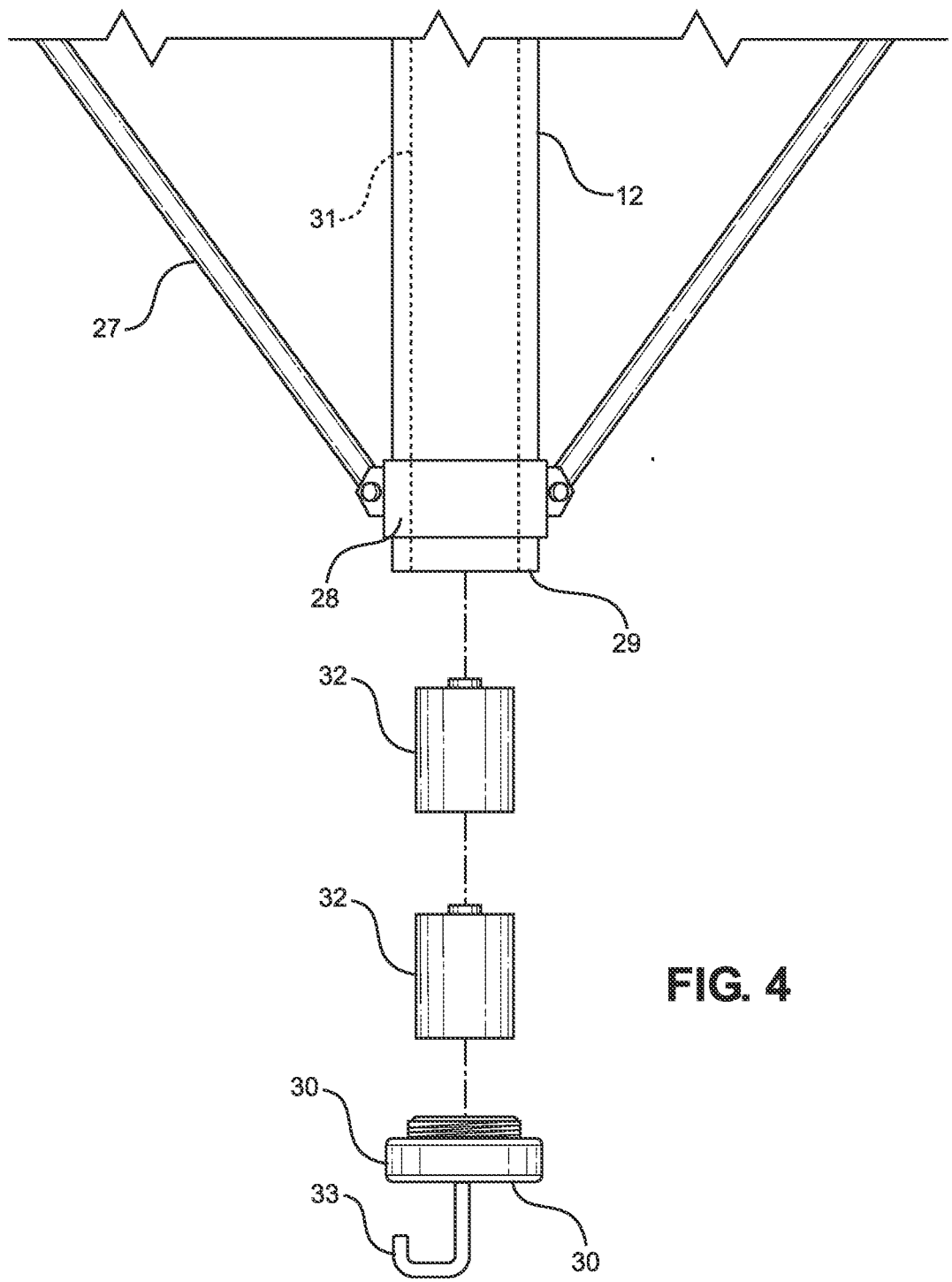
FIG. 4 shows an exploded view of the central shaft of an embodiment of the camera tripod with surge protected outlets.

Referring now to FIG. 4, there is shown an exploded view of the central shaft of an embodiment of the camera tripod with surge protected outlets. In the illustrated embodiment, the central shaft 12 comprises an open distal end 29 defining an interior volume, wherein the interior volume comprises a battery compartment 31 configured to operably connect one or more batteries 32 to the plurality of outlets similar to the previously described cable arrangement. In such embodiments, a cap 30 is removably securable to the open distal end 29, wherein the cap 30 retains the batteries 32 within the battery compartment 31. A contact disposed on an interior side of the cap 30 serves to complete an electrical circuit with the batteries 32, such that power is transferred through the insulated wiring disposed within the legs and base to the plurality of outlets. In this manner, the user can power electronic devices operably connected to the plurality of outlets via the batteries 32 disposed within the central shaft 12, thereby providing portability and removing reliance on existing external power sources. Additionally, as many electronic devices rely on several unique batteries, the present embodiment allows a series of commonly available and easily replaceable or rechargeable batteries 32 such as C-, D-, and AA-cell batteries 32 to provide power to the plurality of outlets. In some embodiments, an indicator is disposed on an exterior surface of the central shaft 12, wherein the indicator displays a current level of charge of the batteries 32 within the battery compartment 31. The indicator is contemplated to comprise a single light indicating a fully charged status when illuminated, a series of sequentially illuminating lights to display an approximate level of charge within the batteries 32, a digital display, or the like. In some embodiments, the battery compartment 31 and previously described cable are simultaneously present to provide the user with multiple options for providing power to the plurality of outlets. Similarly, in some such embodiments, the cable operably connects the battery compartment 31 to an external power source to charge the batteries 32 within the battery compartment 31. In this manner, the user can ensure the batteries 32 retain a charge between stationary and portable use. In the shown embodiment, the cap 30 is securable to the open distal end 29 via threaded engagement. In the shown embodiment, the cap 30 further comprises a support hook 33 disposed on a lower end 34 of the cap 30, wherein the support hook 33 is configured to retain objects, such as camera or accessory bags thereon.

In the shown embodiment, the plurality of legs is affixed to the central shaft 12 via a plurality of braces 27 extending between the central shaft 12 and the plurality of legs. The braces 27 are pivotally affixed to each of the plurality of legs at a first end thereof, and pivotally affixed to a collar 28 at a second end of the braces 27. The collar 28 is slidably disposed about the central shaft 12, such that the collar 28 moves along the central shaft 12 as the plurality of legs are moved between an open position and a closed position. In this manner, the plurality of braces 27 are configured to provide additional stability to the plurality of legs, thereby ensuring that the plurality of legs remain in a deployed position. In some embodiments, the plurality of braces 27 are configured to lock in a deployed position to prevent the plurality of legs from pivoting inwardly towards the central shaft 12 when in use.

Referring now to FIG. 5, there is shown a perspective view of an embodiment of the camera tripod with surge protected outlets in use. In operation, the user can secure a camera 15 or other electronic device to the base 13 via the threaded connection. A power cable associated with the camera 15 can then be inserted into one of the plurality of outlets 17 disposed on the plurality of legs, at which point the camera 15 is provided power by an external power source via a cable disposed within a compartment, or an internal power source via the plurality of batteries disposed within the central shaft. Additional accessories or electronic devices can be connected to the remaining plurality of outlets 17 or the plurality of USB ports 19. In this manner, the user can declutter the surrounding area, minimizing the number of simultaneously used power cables extending between the tripod and a wall outlet or generator. The user can then pivot and rotate the base 13 via actuation of the tension handle 25 to direct the attached device in a desired direction. In this manner, users can utilize a variety of electronic devices while traditional power sources are unavailable or while minimizing the number of exposed power cabling posing tripping hazards.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly, and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A camera tripod with surge protected outlets, comprising:
    a central shaft affixed to a base;
    a plurality of support legs pivotally affixed to the base;
    wherein each of the plurality of support legs is telescopically adjustable in length;
    wherein the base removably secures a camera thereto via a threaded connection;
    at least one surge protected outlet affixed to one of the plurality of support legs;
    wherein the surge protected outlet is able to be electrically connected to an external power source; and
    wherein the tripod comprises a battery compartment configured to electrically connect one or more batteries to the surge protected outlet.

2. The camera tripod of claim 1, further comprising at least one USB port on one of the plurality of support legs, the USB port configured to be operably connected to the external power source or the one or more batteries.

3. The camera tripod of claim 1, further comprising a cable disposed within a compartment defined within one of the plurality of support legs, wherein the cable is configured to operably connect the external power source to the surge protected outlet.

4. The camera tripod of claim 3, wherein the cable is retractably affixed to a spool within the compartment, wherein the cable is biased to a retracted position about the spool.

5. The camera tripod of claim 3, further comprising a door affixed to the compartment, wherein the door is selectively movable between an open position and a closed position, wherein the closed position, the door encloses the compartment.

6. The camera tripod of claim 3, wherein the electrical connection between the cable and the surge protected outlet comprises insulated wiring disposed between the central shaft and the plurality of support legs.

7. The camera tripod of claim 1, wherein the at least one surge protected outlet is pivotally affixed to one of the plurality of support legs.

8. The camera tripod of claim 1, wherein the base is pivotally affixed to the central shaft, such that an angle of the base relative to a ground surface is adjustable.

9. The camera tripod of claim 8, further comprising a tension handle affixed to the base, wherein the tension handle is configured to selectively pivot the base when actuated.

10. The camera tripod of claim 1, wherein the surge protected outlet is disposed on an upper section of one of the plurality of support legs.

11. The camera tripod of claim 1, further comprising a plurality of braces hingedly affixed to each of the plurality of support legs and a collar, wherein the collar is slidably disposed about the central shaft.

12. A camera tripod with surge protected outlets, comprising:
a central shaft affixed to a base;
wherein the central shaft comprises an open distal end defining an interior volume;
a cap removably securable to the open distal end of the central shaft;
a plurality of support legs pivotally affixed to the base;
wherein each of the plurality of support legs is telescopically adjustable in length;
wherein the base removably secures a camera thereto via a threaded connection;
at least one surge protected outlet affixed to one of the plurality of support legs;
wherein the interior volume comprises a battery compartment configured to electrically connect one or more batteries to the surge protected outlet; and
wherein the surge protected outlet is able to be electrically connected to an external power source.

13. The camera tripod of claim 12, further comprising at least one USB port on one of the plurality of support legs, the USB port configured to be operably connected to the external power source or the one or more batteries.

14. The camera tripod of claim 12, further comprising a support hook disposed on a lower end of the cap.

15. The camera tripod of claim 12, wherein the electrical connection between the battery compartment and the surge protected outlet comprises insulated internal wiring disposed between the central shaft and the plurality of support legs.

16. The camera tripod of claim 12, wherein the at least one surge protected outlet is pivotally affixed to one of the plurality of support legs.

17. The camera tripod of claim 12, wherein the base is pivotally affixed to the central shaft, such that an angle of the base relative to a ground surface is adjustable.

18. The camera tripod of claim 17, further comprising a tension handle affixed to the base, wherein the tension handle is configured to selectively pivot the base when actuated.

19. The camera tripod of claim 12, wherein the surge protected outlet is disposed on an upper section of one of the plurality of support legs.

20. The camera tripod of claim 12, further comprising a plurality of braces hingedly affixed to each of the plurality of support legs and a collar, wherein the collar is slidably disposed about the central shaft.

* * * * *